United States Patent
Bula et al.

(10) Patent No.: US 10,027,855 B2
(45) Date of Patent: Jul. 17, 2018

(54) SYSTEM FOR SYNCHRONIZATION IN A LINE SCANNING IMAGING MICROSCOPE

(75) Inventors: Witold Bula, St Catharines (CA); Pavel A. Fomitchov, Piscataway, NJ (US); Steve Goodson, Issaquah, WA (US); Erwen Mei, Piscataway, NJ (US); Yang Zhang, Bordentown, NJ (US)

(73) Assignee: GE HEALTHCARE BIO-SCIENCE CORP., Piscataway, NJ (US)

( * ) Notice: Subject to any disclaimer, the term of this patent is extended or adjusted under 35 U.S.C. 154(b) by 558 days.

(21) Appl. No.: 13/704,748

(22) PCT Filed: Jun. 29, 2011

(86) PCT No.: PCT/SE2011/050867
§ 371 (c)(1),
(2), (4) Date: Dec. 17, 2012

(87) PCT Pub. No.: WO2012/002893
PCT Pub. Date: Jan. 5, 2012

(65) Prior Publication Data
US 2013/0093873 A1    Apr. 18, 2013

Related U.S. Application Data

(60) Provisional application No. 61/359,891, filed on Jun. 30, 2010.

(51) Int. Cl.
*H04N 5/04* (2006.01)
*G02B 21/00* (2006.01)
(Continued)

(52) U.S. Cl.
CPC .......... *H04N 5/04* (2013.01); *G02B 21/0048* (2013.01); *H04N 1/113* (2013.01); *H04N 1/195* (2013.01);
(Continued)

(58) Field of Classification Search
CPC .................................................. G02B 21/0048
(Continued)

(56) References Cited

U.S. PATENT DOCUMENTS 4,826,299 A    5/1989   Powell
5,067,805 A *  11/1991  Corle ................. G02B 21/0044
                                                       359/235

(Continued)

FOREIGN PATENT DOCUMENTS

EP        871052 B1     1/2004
EP       1498759 B1    12/2006
(Continued)

OTHER PUBLICATIONS

Realtime stereo 3D confocal microscopy; Brakenhoff 1995.*
(Continued)

*Primary Examiner* — Luis Perez Fuentes

(57) ABSTRACT

A line confocal microscope system, comprising a scanning unit in the form of a mechanically driven scanning unit with a controllable a scanning trajectory and a two dimensional sensor unit operated in a rolling line shutter mode in synchronization with the scanning unit, wherein the scanning trajectory is set to have an acceleration part outside the field of view of the sensor unit.

11 Claims, 3 Drawing Sheets

(51) Int. Cl.
*H04N 1/113* (2006.01)
*H04N 1/195* (2006.01)

(52) U.S. Cl.
CPC .............. *H04N 2201/04715* (2013.01); *H04N 2201/04755* (2013.01)

(58) Field of Classification Search
USPC .......................................................... 348/79
See application file for complete search history.

(56) References Cited

U.S. PATENT DOCUMENTS

| | | | |
|---|---|---|---|
| 5,703,454 | A | 12/1997 | Taguchi |
| 5,895,915 | A | 4/1999 | DeWeerd et al. |
| 6,317,258 | B1 | 11/2001 | Watanabe |
| 6,429,897 | B2 | 8/2002 | Derndinger et al. |
| 6,437,910 | B1 | 8/2002 | Watanabe |
| 6,982,824 | B2 | 1/2006 | Kei et al. |
| 7,119,898 | B2 * | 10/2006 | Zimmermann ........ G01N 21/64 356/318 |
| 7,335,898 | B2 * | 2/2008 | Donders ............ G02B 21/0036 250/458.1 |
| 7,953,308 | B2 | 5/2011 | Fomitchov |
| 8,013,288 | B2 | 9/2011 | Steinert et al. |
| 8,194,311 | B2 | 6/2012 | Kishimoto |
| 8,488,895 | B2 * | 7/2013 | Muller ............... G02B 21/0028 351/206 |
| 2001/0012069 | A1 | 8/2001 | Derndinger et al. |
| 2003/0173509 | A1 | 9/2003 | Ito et al. |
| 2005/0012989 | A1 | 1/2005 | Kei et al. |
| 2006/0011804 | A1 | 1/2006 | Engelmann et al. |
| 2007/0206192 | A1 | 9/2007 | Fomitchov et al. |
| 2009/0279169 | A1 | 11/2009 | Hoult et al. |
| 2010/0245994 | A1 | 9/2010 | Kishimoto |
| 2011/0261367 | A1 * | 10/2011 | Gmitro ................ A61B 5/0066 356/479 |
| 2013/0087718 | A1 * | 4/2013 | Mei .................... G01N 21/6408 250/458.1 |

FOREIGN PATENT DOCUMENTS

| | | |
|---|---|---|
| EP | 2 187 252 | 5/2010 |
| EP | 2237097 A1 | 10/2010 |
| JP | 10-326587 A | 12/1988 |
| JP | 2000-275528 A | 10/2000 |
| JP | 2001-502820 A | 2/2001 |
| JP | 2003-344781 A | 12/2003 |
| JP | 2005-37690 A | 2/2005 |
| JP | 2005-107098 A | 4/2005 |
| JP | 2008-507719 A | 3/2008 |
| JP | 2008-286624 A | 11/2008 |
| JP | 2009-522605 A | 6/2009 |
| WO | 1999/05852 A | 2/1999 |
| WO | 2006/008637 A1 | 1/2006 |
| WO | 2007/079398 A2 | 7/2007 |
| WO | 2009-075346 A | 6/2009 |

OTHER PUBLICATIONS

Japanese Office Action regarding Japanese Application No. 2013-518334, dated Feb. 3, 2015, 2 pages.
English language translation of Japanese Office Action regarding Japanese Application No. 2013-518334, dated Feb. 3, 2015, 2 pages.

* cited by examiner

SYSTEM FOR SYNCHRONIZATION IN A LINE SCANNING IMAGING MICROSCOPE

CROSS-REFERENCE TO RELATED APPLICATIONS

This application is a filing under 35 U.S.C. 371 of international application number PCT/SE2011/050867, filed Jun. 29, 2011, published on Jan. 5, 2012 as WO 2012/002893, which claims priority to U.S. provisional patent application No. 61/359,891 filed Jun. 30, 2010.

FIELD OF THE INVENTION

The present invention relates to a line scanning imaging system and method for synchronization of the line scan beam and the rolling line shutter camera.

BACKGROUND OF THE INVENTION

Generally, when researching tiny regions of interest on a sample, researchers often employ a fluorescence microscope to observe the sample. The microscope may be a conventional wide-field, structured light or confocal microscope. The optical configuration of such a microscope typically includes a light source, illumination optics, objective lens, sample holder, imaging optics and a detector. Light emitted from the light source illuminates the region of interest on the sample after propagating through the illumination optics and the objective lens. Microscope objective forms a magnified image of the object that can be observed via eyepiece, or in case of a digital microscope, the magnified image is captured by the detector and sent to a computer for live observation, data storage, and further analysis.

In wide-field microscopes, the target is imaged using a conventional wide-field strategy as in any standard microscope, and collecting the fluorescence emission. Generally, the fluorescent-stained or labeled sample is illuminated with excitation light of the appropriate wavelength(s) and the emission light is used to obtain the image; optical filters and/or dichroic mirrors are used to separate the excitation and emission light.

Confocal microscopes utilize specialized optical systems for imaging. In the simplest system, a laser operating at the excitation wavelength of the relevant fluorophore is focused to a point on the sample; simultaneously, the fluorescent emission from this illumination point is imaged onto a small-area detector. Any light emitted from all other areas of the sample is rejected by a small pinhole located in front to the detector which transmits on that light which originates from the illumination spot. The excitation spot and detector are scanned across the sample in a raster pattern to form a complete image. There are a variety of strategies to improve and optimize speed and throughput which are well known to those skilled in this area of art.

Line-confocal microscopes are a modification of the confocal microscope, wherein the fluorescence excitation source is a laser beam; however, the beam is focused onto a narrow line on the sample, rather than a single point. The fluorescence emission is then imaged on the optical detector through the slit which acts as the spatial filter. Light emitted from any other areas of the sample remains out-of-focus and as a result is blocked by the slit. To form a two-dimensional image the line is scanned across the sample while simultaneously reading the line camera. This system can be expanded to use several lasers and several cameras simultaneously by using an appropriate optical arrangement.

One type of line confocal microscope is disclosed in U.S. Pat. No. 7,335,898, which is incorporated by reference, wherein the optical detector is a two dimensional sensor element operated in a rolling line shutter mode whereby the mechanical slit can be omitted and the overall system design may be simplified. However, this type of system relies on highly accurate synchronization between the motion of the focused laser line and the moving rolling line shutter as any error in synchronization leads to:
 Losses of fluorescent signal, that reduces overall sensitivity of the imaging system,
 Appearance of irregular image artifacts such as intensity gradient from top to bottom of the image,
 Non-linear response of the system when signal strength is not proportional to the exposure time that complicates selection of optimal imaging parameters.

SUMMARY OF THE INVENTION

The object of the invention is to provide a new line scan confocal microscope and a method of synchronization, which overcomes one or more drawbacks of the prior art. This is achieved by the line scan confocal microscope and the method of synchronization as defined in the independent claims.

One advantage with such a line scan confocal microscope is that it provides improved and reliable synchronization of the motion of the focused laser line and the moving rolling line shutter in a line confocal microscope of rolling line shutter type.

Further scope of applicability of the present invention will become apparent from the detailed description given hereinafter. However, it should be understood that the detailed description and specific examples while indicating preferred embodiments of the invention are given by way of illustration only. Various changes and modifications within the spirit and scope of the invention will become apparent to those skilled in the art from the detailed description below.

DETAILED DESCRIPTION OF THE INVENTION

The presently preferred embodiments of the invention are described with reference to the drawings, where like components are identified with the same numerals. The descriptions of the preferred embodiments are exemplary and are not intended to limit the scope of the invention.

Figure 1:
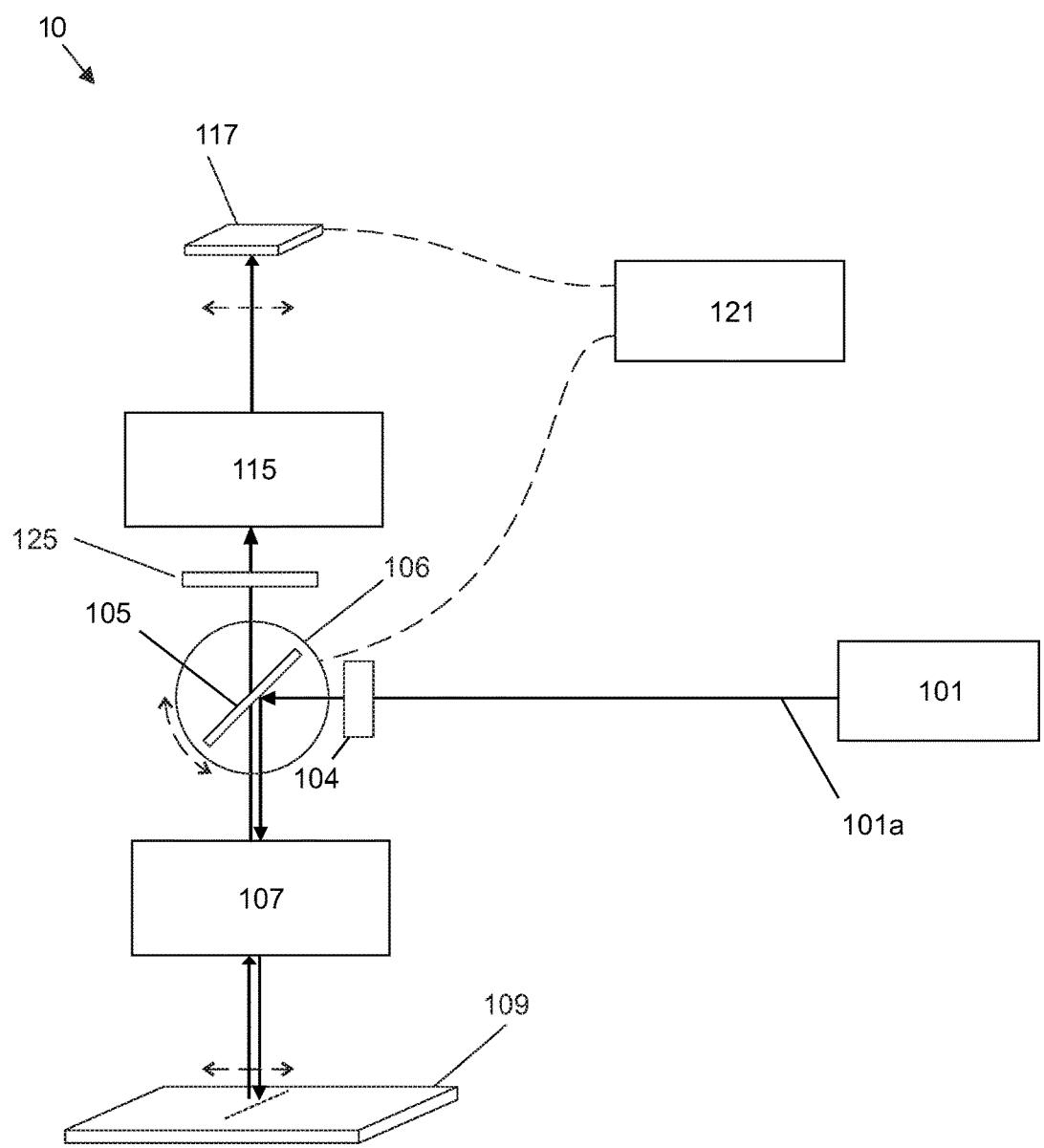
FIG. 1 is a block diagram of a line scanning imaging system that includes a rolling line shutter type detector in accordance with one embodiment of the invention.

FIG. 1 illustrates a block diagram of the essential components of one embodiment of a line scanning microscope system 10. The disclosed microscope system 100 includes the following components: a light source 101, line forming unit 104, scanning unit 105, objective lens 107, a sample 109, imaging optics 115, a two dimensional sensor unit 117, and a control unit 121. The system may contain other components as would ordinarily be found in confocal and wide field microscopes. The following sections describe these and other components in more detail. For a number of the components there are multiple potential embodiments. In general the preferred embodiment depends upon the target application.

The light source 101 can be any source capable of delivering light of the excitation wavelength to the target. According to one embodiment the light source 101 comprises one or more excitation lasers. In one embodiment it comprises 4+ lasers covering the optical spectrum from the near IR to the near UV. The light from each of these lasers can be coupled to the rest of the optical train by either delivering the light as a free space beam of the appropriate diameter, direction and degree of collimation or via fiber optic light delivery system. Alternatively, the light source may be a tuneable laser capable of being tuned to the appropriate excitation wavelengths. In a further preferred embodiment the light is delivered as a highly collimated beam with a specified beam diameter (standard methods can be used to achieve this) or via an optical fiber (ideally a single-mode polarization preserving fiber is employed). In the embodiment comprising two or more lasers, the light source may comprise a laser selection module (not shown) for selecting the light of desired wavelength.

Light beam 101a is emitted by: the light source 101, and formed to a line shaped beam by the line forming unit 104. Preferred embodiments of the line-forming unit 104 include, but are not limited to, a Powell lens (as described U.S. Pat. No. 4,826,299, incorporated herein by reference). The shape of the second conic-cylindrical surface is preferably specified to achieve both uniform illumination within 10% over the range $\Delta\theta$ and more than 80% transmission of the laser light through the objective 107. Alternative line forming units 104 such as cylindrical lenses, diffraction gratings, and holographic elements can also be used.

The scanning unit 105 provides the scanning of the line shaped excitation light beam in the focal plane of the objective across the field of view of the microscope. According to one embodiment, the scanning unit 105 is a mechanically driven scanning mirror unit 105 that comprises a mirror that can be tilted about an axis transverse to the plane of FIG. 1. The angle of the tilt is set by an actuator 106. In the embodiment of FIG. 1, the scanning mirror unit 105 is configured to allow excited radiation from the sample 109 pass to the imaging optics 115 and the two dimensional detector unit 117 without significant distortion or attenuation. According to one embodiment, the minor 105 is comprised of a narrow mirror centered on, or axially offset from, the rear of the objective 107, such that the major part of the excited light from the sample 109 pass at the side of the mirror 105. According to one embodiment, the geometry and reflective properties of said narrow mirror may be as follows:

Width~1/10 times the diameter of the rear aperture of the objective.

Length~1.6 times the diameter of the rear aperture of the objective.

Optically flat.

Highly reflective 300 nm to 800 nm.

These particular properties of the mirror provide several key advantages:

(1) It makes it possible to use a single mirror for all excitation wavelengths. Relative to a multiband dichroic mirror this greatly increases the flexibility in adapting the system to a wide range of lasers.

(2) It uses the rear aperture of the objective at its widest point. This leads to the lowest achievable level of diffraction which in turn yields the narrowest achievable width of the line of laser illumination at the sample.

According to another embodiment, the scanning mirror unit 105 comprises an optional dichroic mirror that is arranged to allow excited light from the sample 109 to pass. The design of the dichroic mirror will be such that the radiation of all wavelengths from the excitation light source are efficiently reflected, and that light in the wavelength range corresponding to fluorescence emission is efficiently transmitted. A multi band mirror based on Rugate technology is a preferred embodiment.

Figure 2:
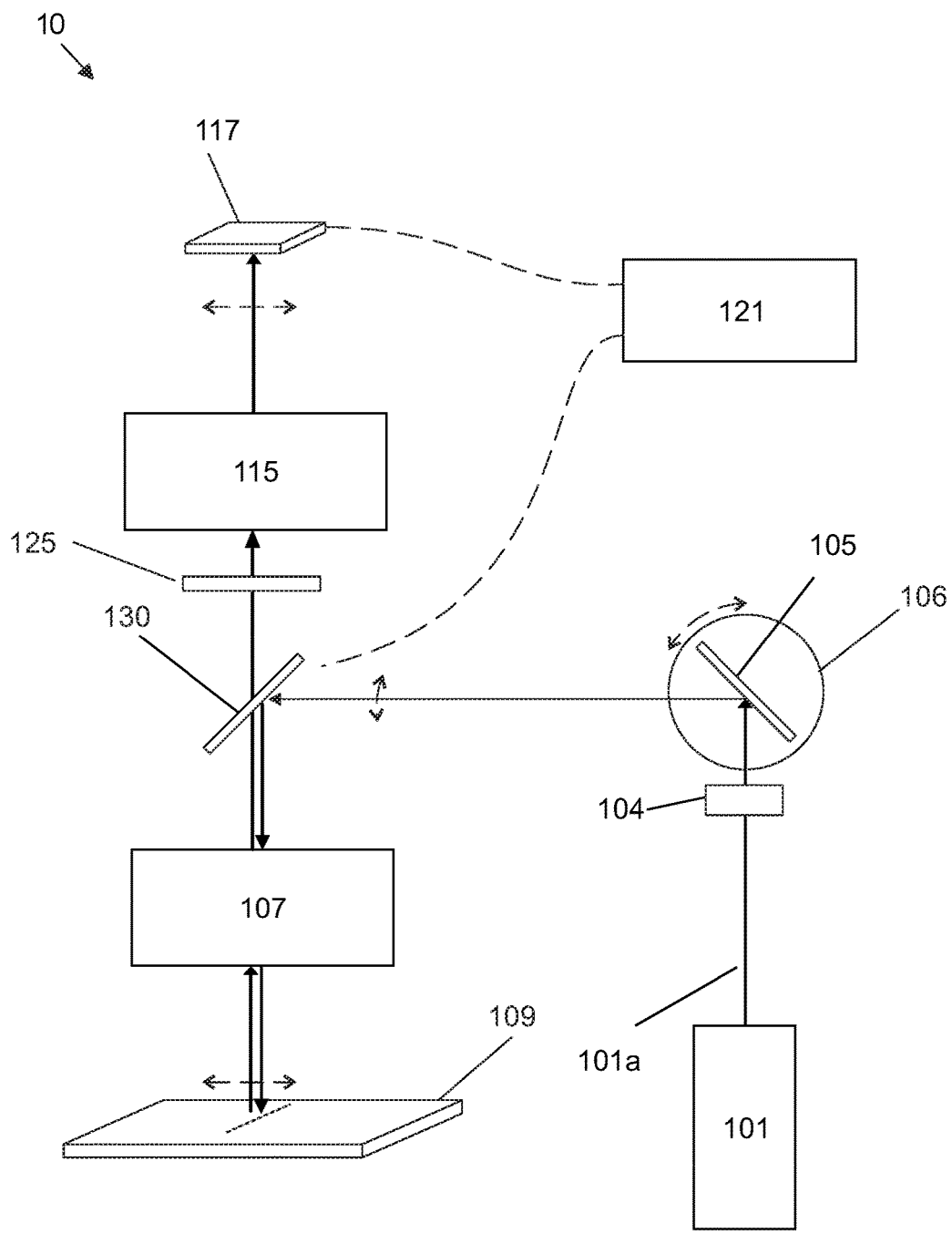
FIG. 2 is a block diagram of a line scanning imaging system that includes a rolling line shutter type detector in accordance with an alternative embodiment of the invention.

FIG. 2 shows another schematic embodiment, wherein the scanning mirror unit 105 is located outside of the optical path of the excited light from the sample 109 to the two dimensional detector unit 117. In this embodiment, a fixed dichroic mirror 130 is used to reflect the light beam from the scanning mirror unit 105 to the sample 109, and the excited light of one or more wavelengths is allowed to pass though the same to the two dimensional detector unit 117.

According to one embodiment the actuator 106 is a galvanometer with an integral sensor for detecting the angular position, such as a position encoder on the tilt axis to register the absolute position of the scanning mirror 105, but it may be comprised of another type of actuator capable of driving the scanning mirror. According to one embodiment, the actuation of the actuator 106 can be controlled such that the scanning trajectory of the scanning mirror 105 is controllable. As will be disclosed in more detail below, the actuator and thus the scanning trajectory of the scanning mirror 105 is controlled by the control unit 121 or the like.

The scanning unit 105 is arranged to direct the light beam 101a on the back aperture of the objective 107 and to scan the beam. In order to view the sample in different magnifications, the microscope may comprise two or more objectives 107 of different magnification, e.g. 10× and 20× or the like. The light emitted or reflected from the sample 109 is collected by the objective lens 107, filtered by a filter unit 125, and then an image of the sample 109 is formed by the typical imaging optics 115 on the two dimensional sensor unit 117. The filter unit 125 is selected to let the excitation fluorescence wavelengths go through to the detector unit 117 and to block the excitation radiation wavelength(s).

The two dimensional sensor unit 117 is comprised of any suitable optical sensor array or camera capable of detecting the fluorescent light and generating an image, and that may be operated in a rolling line shutter mode. According to one embodiment, the two dimensional sensor unit 117 is a CMOS camera. The two dimensional sensor unit 117 is placed in a position optically conjugated to the imaging area on the sample and the shape and the size of the rolling line shutter detection area may be adjusted to be equal or smaller than an image of optically conjugated illumination line on the sample. The fluorescent emission that is delivered to the rolling line shutter detection area of the optical receiver is detected by reading the signals from the pixels located within the line shutter detection area of the sensor unit. The detection area of the sensor unit that is located outside of the rolling line shutter detection area of the sensor unit is disregarded during operation in rolling line shutter mode in order to reject optical signals received outside of the rolling line shutter detection area such as stray light and out of plane fluorescence. As the illumination area is scanned across the target/sample 109 using the scanning mirror unit, the rolling line shutter detection area of the sensor unit is moved in synchronization to maintain the optical conjugation with the illumination line on the sample.

As is schematically indicated in FIG. 1, the line scanning microscope system 10 comprises a control unit 121, which may be integrated, partly integrated or external to the microscope system 10. The control unit 121 may e.g. be a computer comprising necessary software to control the system 10 and to collect image data from the sensor unit 117. It may further comprise image processing capabilities to e.g. to enable subsequent analysis of the acquired images etc.

One main feature of the control unit 121 is to establish synchronization between the scanning unit 105 and the rolling line shutter operation of the sensor unit 117. The control unit 121 is arranged to control the scan trajectory for the scanning unit 105 with respect to rolling line shutter operation of the sensor unit 117, and vice versa, as well as the mutual timing. As mentioned above, according to one embodiment, the scanning trajectory of the scanning mirror 105 is controllable by controlling the actuation of the actuator 106 in accordance with a set of scan parameters defining the scanning trajectory, comprising scan origin, scan endpoint, scan velocity, scan acceleration rate, scan deceleration rate, etc. The rolling line shutter operation may be controlled in accordance with a set of shutter parameters defining the optical detection operation of the sensor unit, comprising line width, shutter velocity, shutter origin and endpoint etc.

In order to obtain high quality images, the rolling line shutter operated registration of the fluorescence signal resulting from the scan of the line shaped light beam across the field of view need to be synchronized. This synchronization can be broken into two categories: temporal sync and spatial sync.

Temporal synchronization means that the velocity of the scanning line of the fluorescence signal resulting from the scanning is equal to the velocity of the rolling line shutter of the sensor unit 117 for any exposure time within an allowed range.

Spatial synchronization means that the fluorescence signal resulting from the scanning during image acquisition is always located in the center of rolling line shutter detection area of the sensor unit 117.

In order to achieve high quality imaging, both conditions of spatial and temporal synchronization shall be met during whole period of acquisition of a single image.

According to one embodiment, improved synchronization is achieved by setting the scanning trajectory to have an acceleration part outside the field of view of the sensor unit 117, thereby allowing the scanning unit 105 acceleration time and angle for scanning velocity stabilization. Due to the rolling line shutter mode of operation, the field of view of the sensor unit 117 is defined as the optically active area of the sensor unit 117 during one scan of the microscope system 10. In the situation where the optics allow scanning over the whole sensor unit 117, the optical active area may be equal to the full sensor unit area, but the optical active area may be restricted by the optics or by the scan and shutter parameters. According to one embodiment, the size of the optical active area is selectable and may thus be adjusted to a particular imaging situation or the like. In this way it is e.g. possible to image a selected portion of a sample in greater detail.

Similarly, according to one embodiment, the scanning trajectory of the scanning unit 105 is set to have a deceleration part outside the field of view of the sensor unit 117 to avoid early decrease in velocity of the scanning velocity.

According to one embodiment the scanning trajectory of the scanning unit is controlled as a function of image acquisition time, e.g. by adjusting the scan parameters for scan origin, scan endpoint and scan acceleration rate to achieve a constant scan velocity over the full field of view of the sensor unit 117, while preserving the time between two consecutive scans as low as possible.

According to one embodiment the scanning trajectory of the scanning mirror unit is controlled as a function of rolling line shutter width, e.g. by adjusting the scan parameters for scan origin, and scan endpoint to achieve a scan that is centered on the rolling line shutter during the whole scan.

According to one embodiment, in order to achieve temporal synchronization, the image acquisition of the sensor unit and the scanning motion of the scanning mirror unit may be initiated at a predetermined delay with respect to each other to compensate for differences in response times for the units. The respective scan motions may be initiated by use of one or more common external trigger to start image acquisition and there may be provided one or more programmable delays for the initiation of the scanning unit 105 and the rolling line shutter of the sensor unit 117 to compensate different response time of these devices with respect to the common external trigger.

Figure 3:
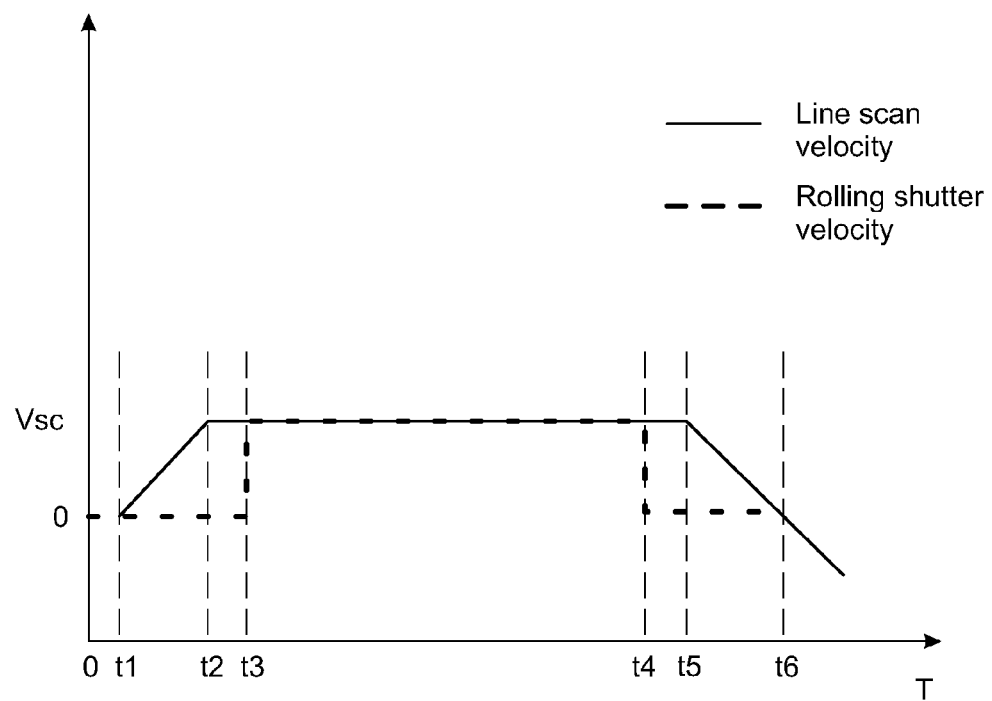
FIG. 3 is a schematic illustration of one embodiment of synchronization.

FIG. 3 shows a schematic example of the relative scan velocities for the scanning unit 105 and the rolling line shutter of the sensor unit 117 during one image scan cycle. At t1 the scan is initiated and scanning unit 105 is set in an acceleration phase until t2 when the predetermined scan speed Vsc is reached which is kept constant until t5 when the scanning trajectory is ended by a deceleration phase and the scanning unit comes to a stop at t6. As is illustrated in FIG. 2, the rolling line shutter does not have any acceleration or deceleration phases due to its electronic nature. However, the rolling line shutter operation at the scan speed Vsc may need to be the initiated at a time point prior to t3 as there may be a delay before the rolling line shutter is configured and start moving. As indicated in FIG. 2, the scan and shutter parameters are controlled so that the scanning unit 105 has reached the predetermined scan speed before it reaches the field of view of the sensor unit 117, as is indicated by the scan velocity profile of the rolling shutter velocity.

In FIG. 2 it is indicated that the scanning unit 105 initiates a reversed acceleration at t6, in one embodiment, the reversed scan is performed without registration of the emitted fluorescence radiation by means of the sensor unit 117, but in another embodiment, the sensor unit 117 is arranged to operate in reversed rolling line shutter mode to register a subsequent image during the reverse scan.

In situations when the microscope system is designed with optics with well corrected field curvature the scanning trajectory of the scanning mirror unit may be linear over the whole field of view. However, in situations when the microscope system is designed with wide field optics with significant field curvature, the scanning trajectory of the scanning mirror unit may be adapted to the field curvature of the optics, to compensate for the field curvature.

According to one embodiment, the synchronization of the scanning mirror unit and the sensor unit is tuned in real time by feedback control of the scanning unit based on the angular position of the scanning mirror e.g. detected by a position encoder, and the position of the rolling shutter line of detection of the two dimensional detector unit 117. Said readout may e.g. be in the form of an error signal, e.g. from the scanning actuator 106. The error signal from the actuator may e.g. be a detected difference in measured actuation with respect to the desired angle according to the scanning trajectory.

According to one embodiment, the synchronization of the scanning unit and the sensor unit is tuned in real time by detecting the scanning position and the response time of the scanning unit and correlating the scanning position and response time to the present rolling shutter position of the two dimensional sensor unit, and controlling the scanning unit for synchronized positioning at subsequent rolling shutter positions of the two dimensional sensor unit based on the detected response time.

According to a general embodiment, one scan comprises the steps:

positioning the scanning unit at a predefined starting location outside the field of view of the sensor unit, moving the scanning unit to the edge of the field of view of the sensor unit, and controlling the scanning speed in accordance with preset line scan parameters, initiating the rolling shutter mode registration when the scanning unit is positioned at the edge of the field of view of the sensor unit, registering line-by-line control signals from the sensor unit, controlling the scanning unit based on the detected response time to move in rolling shutter line-size steps whenever the line-by-line control signal from the sensor unit changes, and ending the line scan when a predetermined number of line-by-line control signals have been received from the sensor unit indicating that the field of view has been scanned.

According to one embodiment, the control unit 121 comprises a low-level microprocessor for real-time control of the components of the microscope system 10, such as the scanning unit 105, the two dimensional detector unit 117, and light source 101. The scanning unit 105 is comprised of a scanning mirror arranged to be tilted about a scan axis by a digitally controlled actuator 106 such as a galvo unit. The digitally controlled actuator 106 has a position encoder on the tilt axis to register the absolute position of the scanning mirror 105 whereby the digital location of the tilt axis is always known. In order to provide real-time control of the synchronization, the digitally controlled actuator 106 and the two dimensional detector unit 117 are connected to the microprocessor control unit 121 by a high-speed digital connection. In this embodiment, the microprocessor control unit 121 is capable of instructing the digitally controlled actuator 106 where to go, whereby the digitally controlled actuator 106 quickly responds with the requested location. According to one embodiment, the high-speed digital connection is fast enough for the microprocessor control unit 121 to position the digitally controlled actuator 106 to scan the line shaped excitation light on a line-by-line basis during a scan, with respect to the subsequent lines of detection defined by the line shutter detection area of the two-dimensional sensor unit 117. As mentioned above, the microprocessor control unit 121 is arranged to initiate the rolling shutter operation of the two dimensional sensor unit 117 by providing a start signal. The two dimensional sensor unit 117 is in turn arranged to provide line-by-line control signals to the microprocessor control unit 121 that watches the line-by-line control signal from the two dimensional sensor unit 117 to keep track of the relative position of the line that is being digitized. According to one embodiment, the light source 101 is digitally controllable by the microprocessor control unit 121, whereby the microprocessor can turn on/off the light source 101 within the time it takes to scan one line.

The synchronization according to this embodiment is based on a very stable and rigid instrumental platform wherein the mutual spatial location of the rolling shutter line of the two-dimensional sensor unit 117 and the illumination line position from by the digitally controlled actuator 106 is fully characterized and known. Hence it is possible for the control unit 121 to instruct the digitally controlled actuator 106 to position the scan line of excitation light at a position that is optically conjugate to a specific rolling shutter detection line of the two dimensional sensor unit 117. As the digital location of the tilt axis the digitally controlled actuator 106 is always known through the position encoder on the tilt axis it is possible to follow the position of the digitally controlled actuator 106 in real time and utilize the known position to achieve full synchronization. According to one embodiment, the microprocessor control unit 121 is arranged to determine the response time between submission of an instruction to the digitally controlled actuator 106 to move to a new location and the position encoder returns that the actuator has arrived at the new location. Based on the registered response time, the microprocessor control unit 121 is arranged to adjust the timing of subsequent instructions to move to the digitally controlled actuator 106 in order to position the illumination line at the sample in a position conjugate to the present position of the rolling shutter line of the two dimensional sensor unit 117. Hence, full synchronization may be achieved on the fly for a continuous range of scan speeds and scan areas without the need to predefine the response time of the digitally controlled actuator 106 for each scan speed.

According to one embodiment a line scan may comprise the following steps:

positioning the digitally controlled actuator 106 at a predefined starting location outside the field of view of the sensor unit 117.

moving the digitally controlled actuator 106 to the edge of the field of view of the sensor unit 117, and controlling the scanning speed by using line-sized actuator steps whenever the line-by-line control signal from the two dimensional sensor unit 117 changes, initiating the rolling shutter mode registration when the actuator 106 is positioned at the edge of the field of view of the sensor unit 117, moving the actuator 106 in line-size actuator steps whenever the line-by-line control signal from the two dimensional sensor unit 117 changes, and ending the line scan when a predetermined number of line-by-line control signals have been received from the two dimensional sensor unit 117.

By controlling the scan speed of the digitally controlled actuator 106 based on line-by-line control signals from the two dimensional sensor unit 117, the line scan will be performed as an incremental step wise scanning motion in very high synchronization with the rolling shutter of the two dimensional sensor unit 117.

Throughout this application positional relations of the scanning unit and the sensor unit are referring to the correlated optical positioning with respect to the sample location, i.e. the position of the illumination line and the optically conjugate rolling shutter detection line at the sensor unit.

The presently preferred embodiments of the invention are described with reference to the drawings, where like components are identified with the same numerals. The descriptions of the preferred embodiments are exemplary and are not intended to limit the scope of the invention.

Although the present invention has been described above in terms of specific embodiments, many modification and variations of this invention can be made as will be obvious to those skilled in the art, without departing from its spirit and scope as set forth in the following claims.

What is claimed is:

1. A line confocal microscope system, the system comprising:
   a light source;
   a line forming unit configured to form a line shaped light beam;
   a scanning unit in the form of a mechanically driven scanning unit with a controllable scanning trajectory;
   an actuator configured to detect an angular position of the scanning unit;
   an objective lens; and
   a two dimensional sensor unit operated in a rolling line shutter mode in synchronization with the scanning unit, wherein the scanning trajectory of the scanning unit is controlled by controlling of an actuation of the actuator in accordance with one or more scan parameters defining the scanning trajectory, and the scanning trajectory is set to have an acceleration part outside a field of view of the sensor unit such that the scanning unit reaches a scan speed defined in accordance with the one or scan parameters before it reaches the field of view of the sensor unit, and
   wherein the synchronization of the scanning unit and the sensor unit is tuned on the fly by detecting, in real time, the angular position of the scanning unit and a position of the rolling shutter line of the sensor unit, and controlling the scanning unit for synchronized positioning at subsequent rolling shutter positions based on a signal indicative of any detected difference between a measured actuation of the actuator and a desired angle of the actuator defined according to the scanning trajectory.

2. The line scan confocal microscope system of claim 1, wherein the scanning trajectory of the scanning unit is set to have a deceleration part outside the field of view of the sensor unit.

3. The line scan confocal microscope system of claim 1, wherein the scanning trajectory of the scanning unit is controlled as a function of image acquisition time.

4. The line scan confocal microscope system of claim 1, wherein the scanning trajectory of the scanning unit is controlled as a function of rolling line shutter width.

5. The line scan confocal microscope system of claim 1, wherein the scanning trajectory of the scanning unit is adapted to the field curvature of the optics.

6. The line scan confocal microscope system of claim 1, wherein the image acquisition of the sensor unit and the scanning motion of the scanning unit are initiated at a predetermined delay with respect to each other to compensate for differences in response times for the units.

7. The line scan confocal microscope system of claim 1, wherein the scanning unit is a mechanically driven scanning mirror unit that comprises a scanning mirror that can be tilted about an axis by the actuator.

8. The line scan confocal microscope system of claim 1, wherein the two dimensional sensor unit is a CMOS camera.

9. The line scan confocal microscope system of claim 1, wherein field of view of the sensor unit is equal to the full sensor unit area, and/or is selectable to be a smaller section of the sensor unit area.

10. The line scan confocal microscope system of claim 1, wherein the synchronization of the scanning unit and the sensor unit is tuned in real time by detecting a scanning position, determining a response time of the scanning unit, correlating the scanning position and the response time to a present rolling shutter position of the two dimensional sensor unit, and controlling the scanning unit for synchronized positioning at subsequent rolling shutter positions of the two dimensional sensor unit based on the determined response time.

11. The line scan confocal microscope system of claim 1, wherein a scan performed by the line scan confocal microscope system comprises:
   positioning the scanning unit at a predefined starting location outside the field of view of the sensor unit,
   moving the scanning unit to the edge of the field of view of the sensor unit, and controlling the scanning speed in accordance with preset line scan parameters,
   initiating the rolling shutter mode registration when the scanning unit is positioned at the edge of the field of view of the sensor unit,
   registering line-by-line control signals from the sensor unit,
   controlling the scanning unit based on the detected response time to move in rolling shutter line-size steps whenever the line-by-line control signal from the sensor unit changes, and
   ending the line scan when a predetermined number of line-by-line control signals have been received from the sensor unit indicating that the field of view has been scanned.

* * * * *